United States Patent
Itsuji et al.

(10) Patent No.: US 6,448,553 B1
(45) Date of Patent: Sep. 10, 2002

(54) SIGNAL DETECTOR TO BE USED WITH SCANNING PROBE AND ATOMIC FORCE MICROSCOPE

(75) Inventors: Takeaki Itsuji, Atsugi; Shunichi Shido, Zama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/558,296

(22) Filed: Apr. 25, 2000

(30) Foreign Application Priority Data

Apr. 26, 1999 (JP) .............................. 11-118311
May 13, 1999 (JP) .............................. 11-132288

(51) Int. Cl.⁷ ................................. H01J 37/00
(52) U.S. Cl. .................. 250/306; 250/307; 73/105
(58) Field of Search .................. 250/306, 307; 73/105; 369/126; 310/335

(56) References Cited

U.S. PATENT DOCUMENTS

| | | | |
|---|---|---|---|
| 5,299,184 A | 3/1994 | Yamano et al. | 369/44.28 |
| 5,329,122 A | 7/1994 | Sakai et al. | 250/306 |
| 5,371,727 A | 12/1994 | Shido et al. | 369/124 |
| 5,485,451 A | 1/1996 | Yamano et al. | 369/126 |
| 5,526,334 A | 6/1996 | Yamano et al. | 369/53 |
| 5,804,709 A * | 9/1998 | Bourgoin et al. | 250/306 |
| 5,856,967 A * | 1/1999 | Mamin et al. | 250/306 |
| 5,883,705 A * | 3/1999 | Minne et al. | 250/306 |
| 6,100,524 A * | 8/2000 | Yagi et al. | 250/306 |

* cited by examiner

Primary Examiner—Kiet T. Nguyen
(74) Attorney, Agent, or Firm—Fitzpatrick, Cella, Harper & Scinto

(57) ABSTRACT

A scanning probe having a piezo resistance cantilever section is used with a signal detector comprising a signal detection circuit for detecting a change in the piezo resistance and a circuit for removing an offset component from the signal. Such a scanning probe is used for a scanning probe microscope, in particular an atomic force microscope to obtain a high resolution surface image.

16 Claims, 7 Drawing Sheets

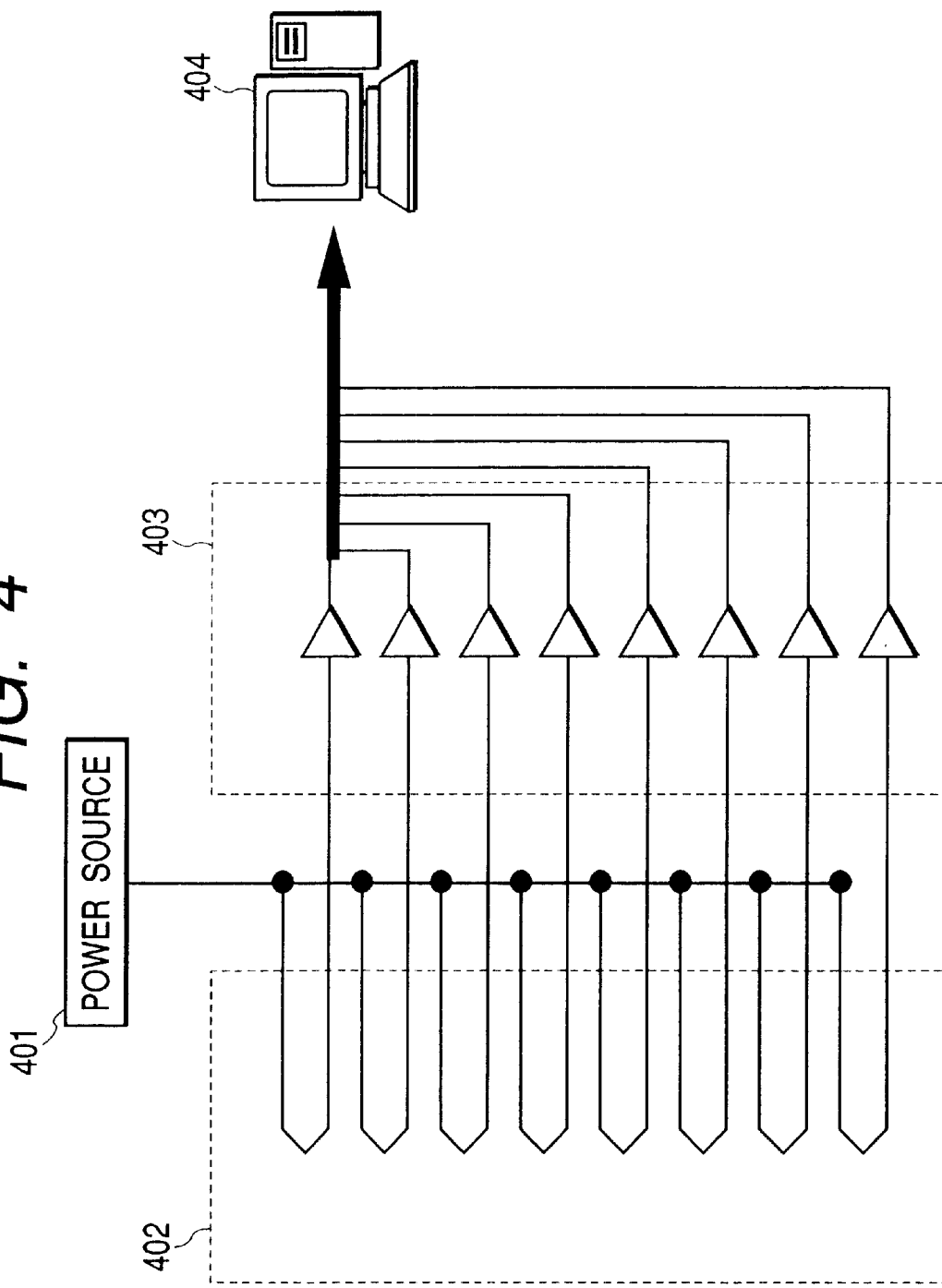

SIGNAL DETECTOR TO BE USED WITH SCANNING PROBE AND ATOMIC FORCE MICROSCOPE

BACKGROUND OF THE INVENTION

1. Field of the Invention

This invention relates to a signal detector to be used with a scanning probe in various observation and/or recording apparatuses utilizing the atomic force that is generated when a probe and a medium are brought into close proximity to each other. More particularly, the present invention relates to a technology of controlling the offset current in such apparatuses.

2. Related Background Art

An atomic force microscope (to be referred to as an AFM hereinafter) is a scanning probe microscope adapted to detect the atomic force generated when the surface of a specimen and the front end of the probe are brought into close proximity to each other by way of the deflection of the probe. While the atomic force may be repulsive or attractive, an AFM generally utilizes the effective region of the repulsive atomic force.

The optical lever system is the most well known system for detecting the amount of deflection of the probe. With this system, a laser beam irradiates the front end of the probe and the displacement of the reflected beam caused by the deflection of the probe is detected by means of a photoelectric conversion device such as a photodiode and the profile of the surface of the specimen is observed by way of the obtained displacement signal. The optical lever system is advantageous in that the amount of displacement can be boosted to improve the resolution by providing a long optical path for the reflected beam. However, use of a long optical path requires a large optical system and a large detection system. Another drawback of the optical lever system is that it involves a cumbersome operation of making a laser beam accurately irradiate the minute end of the probe.

Recently, a technique of detecting the deflection of the probe as a change in the electric resistance of the probe has been attracting attention. A piezoelectric element (piezo resistance element) is typically used as detection means of the probe. A piezo resistance element is affected by external force in two ways; distortion of external profile and its energy band structure so that the electric conductivity and hence the electric resistance of the element is changed by external force. Unlike the optical lever system, a system using such a piezo resistance element does not require an optical system and hence an AFM utilizing such a system can be made very compact and easy to handle.

In recent years, research efforts have been made in the technological field of multi-probe AFM adapted to scan the surface of a specimen by means of a plurality of probes arranged in parallel. This technology is particularly advantageous when the specimen has a large surface area to be scanned because the classical AFM is developed to observe the surface of a specimen in terms of atomic dimension. Since the AFM deals with signals representing the atomic force generated between the probe and the surface of the specimen, which is extremely small, the scan rate of the microscope is inevitably limited and hence it is practically not possible to provide an AFM that can accurately scan a large area. Thus, the multi-probe AFM is designed to scan an extended area by using a relatively large number of probes for scanning without trying to raise the scan rate of each probe. The technique of detecting the amount of deflection of each probe by way of the change in the piezo resistance is more suited than the optical lever system when observing the surface of a specimen by means of multi-probe AFM because, if the optical lever system is used, it is highly difficult to accurately irradiate each of the plurality of probes with a light beam unless a very large optical system is employed.

For detecting the amount of deflection of a probe by way of the change in the piezo resistance, a constant bias has to be applied to the probe. The bias may be a constant current bias or a constant voltage bias, with which the change in the piezo resistance will be detected as a change in the voltage or current. A piezo resistance element that can be used with this system shows a specific resistance (piezo resistance) and the piezo resistance element comes to constantly generate a so-called DC type signal when a bias is applied to it. Additionally, the change in the piezo resistance of a piezo resistance element due to deflection of the probe is as small as $10^{-8}$ times of the initial resistance of the piezo resistance element and hence the signal representing the amount of deflection generated by the change is accordingly very small. Therefore, a highly sensitive detection system is required to detect such signals and additionally the above pointed out DC type signal has to be removed if such signals are to be detected.

Still further, the piezo resistance of a piezo resistance element is significantly affected by temperature. Therefore, the above described DC type signal is also affected by temperature and hence it does not show a constant value but changes with time as the temperature of the element normally changes with time. The influence of this temperature change is particularly remarkable when the probe is brought close to the surface of the specimen. In such a case, the temperature of the piezo resistance element changes due to heat exchange with the probe. This causes signal drift. Finally, when a plurality of probes are used for an AFM, the values of the piezo resistance specific to the respective probes may differ from each other. Thus, there arises the problem that, in addition to, the DC type signals, the signals generated by each of the plurality of probes drift differently from each other.

SUMMARY OF THE INVENTION

In view of the above circumstances, it is therefore an object of the present invention to provide a signal detector adapted to be used with a scanning probe as it can remove the offset signal contained in the output signal representing the change in the piezo resistance of the probe by means of a simple arrangement. Such a signal detector can reliably detect the signal and be used in multiple as it is made free from variances of piezo resistance. Another object of the present invention is to provide an atomic force microscope comprising such a signal detector.

According to the invention, there is provided a signal detector to be used with a scanning probe having a piezo resistance cantilever comprising:

a signal detection circuit for detecting the change in the piezo resistance; and a circuit for removing an offset component from the signal.

According to the invention, there is also provided an atomic force microscope comprising such a signal detector.

BRIEF DESCRIPTION OF THE DRAWINGS

FIG. 4 is a schematic illustration of a model of multi-probe AFM.

DETAILED DESCRIPTION OF THE PREFERRED EMBODIMENTS

Now, the present invention will be described by way of examples.

EXAMPLE 1

Figure 1:
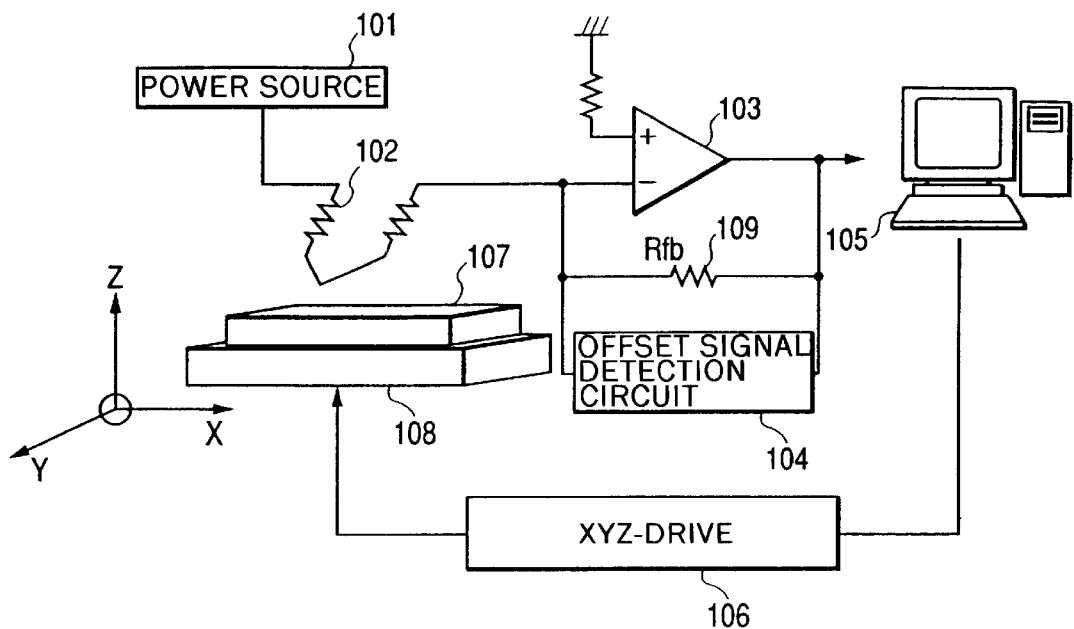
FIG. 1 is a schematic illustration of an embodiment of AFM observation system according to the invention.

FIG. 1 is a schematic illustration of an embodiment of AFM observation system according to an embodiment of the invention. Firstly, the overall configuration of the AFM observation system will be described. A constant voltage is applied to the AFM observation system from voltage source 101. The surface profile of specimen 107 is observed by driving an XYZ stage 108 by means of an XYZ-directional drive system 106 and two-dimensionally scanning the surface (in XY directions) to detect the change in the piezo resistance of probe 102 as a function of the change in the amount of deflection of the probe.

Figure 2:
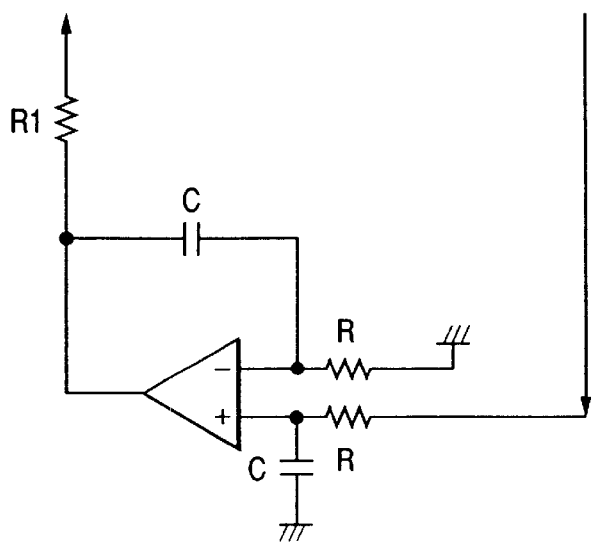
FIG. 2 is a schematic circuit diagram of an embodiment of offset signal detection system according to the invention.
Figure 3A:
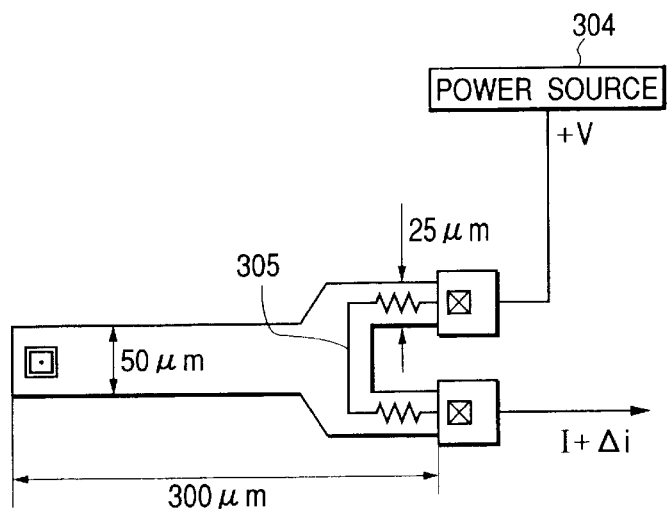
FIGS. 3A and 3B are schematic illustrations of the probe of the AFM used in Example 1.
Figure 3B:
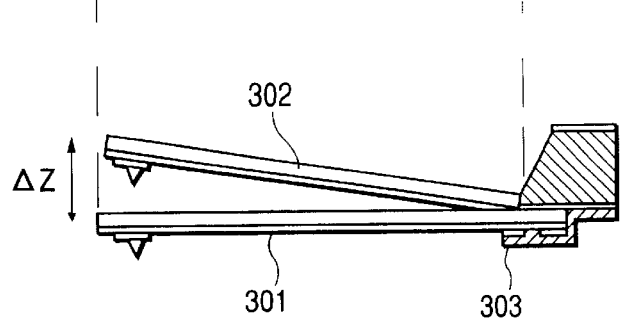

FIGS. 3A and 3B are schematic illustrations of the probe of the AFM used in Example 1. FIG. 2, which illustrates a schematic circuit diagram of an offset signal detection system is discussed below. The probe has a piezo resistance layer 301 formed as n-type layer by implanting As ions onto a highly smooth p-Si substrate 302, to which an aluminum wire 303 is connected. The amount of deflection $\Delta Z$ of the probe obtained by the scanning operation using the stage is detected as the change in the piezo resistance 305 of the piezo resistance layer 301.

As +V is applied to the probe from power source 304, the change in the piezo resistance is detected as current signal $\Delta i$. Meanwhile, as the piezo resistance layer 301 shows a piezo resistance 305 specific to it, the actually detected signal includes both $\Delta i$ and a DC signal I defined in terms of the applied voltage 304 and the piezo resistance 305. The DC signal defined in terms of the applied voltage 304 and the piezo resistance 305 shows a phenomenon of drifting with time because the piezo resistance 305 of the probe is highly sensitive to temperature change and therefore changes easily.

Generally, the ratio of the change in the piezo resistance of a probe to the piezo resistance 305 is as small as $10^{-8}$ and the change in the electric current $\Delta i$ can only be detected as corresponding to the change in the resistance defining the DC signal I. Therefore, when detecting the micro-signal $\Delta i$, the DC signal I has to be removed in advance. Otherwise, the micro-signal would be hidden by the DC signal and any attempt for detecting the micro-signal would fail if the micro-signal $\Delta i$ is amplified in the presence of the DC signal I because of the significant dimensional difference between the micro-signal $\Delta i$ and the DC signal I.

When trying to amplify the micro-signal to a detectable level by means of an operational amplifier, it can easily become saturated and undetectable because of the existence of the DC signal I. Thus, the DC component has to be removed before detecting the micro-signal $\Delta i$. When removing the DC signal I, the problem that it can drift with time has to be taken into consideration. Therefore, ideally, the drifting DC signal should be monitored if it is removed in a well controlled manner. The phenomenon of drifting becomes remarkable when the tip of the probe is brought close to the surface of the specimen. Referring to FIG. 1, offset signal detection system 104 is responsible for removing the DC signal I. The operation of imaging the micro-signal $\Delta i$ detected by micro-signal detection system 103 and that of the overall AFM observation system are controlled by computer 105.

Now, the operation of the AFM observation system will be discussed below. The current signal $(I+\Delta i)$ obtained by the probe by driving the XYZ stage 108 two dimensionally along the surface of the specimen is converted into voltage signal $(I+\Delta i)R_{fb}$ by feedback resistor Rfb 109 of the micro-signal detection system 103. The offset detection system 104 refers to the component of the voltage signal that corresponds to the DC signal and subtract the DC component from the current signal $(I+\Delta i)$ input out of the piezo resistance element. Thus, it is possible to detect only the micro-signal $\Delta i$. Since the offset signal detection system 104 forms a loop of constantly monitoring the output of the micro-signal detection system 103 and putting back the DC signal component to the input, it can successfully cope with the DC signal component that drifts with time.

FIG. 2 is a schematic circuit diagram of an offset signal detection system 104 that can be used for the purpose of the invention. It is to be appreciated that the circuit comprises an integration circuit. As for the voltage signal obtained from the micro-signal detection system 103, the frequency components below a cut-off frequency given by CR is separated as a DC component. The signal for the separated DC component is converted back into a current signal by resistor R1 and subtracted from the input of the micro-signal detection system 103 (shown in FIG. 1). It is to be appreciated that the present invention is not limited to the use of an integration circuit and a low pass filter (LPF) or some other circuit that can separate the DC component in terms of frequency may alternatively be used.

An experiment of AFM observation was carried out by using the above described detection system. A standard sample with lines & spaces of 500 nm having a depth of 18 nm was used as specimen. A 1 $\mu$F capacitor and a 100 M$\Omega$ resistor were used for the CR elements of the offset detection system. Thus, the cut-off frequency obtained by means of the elements was 2 mHz. The piezo resistance of the probe used in the experiment was about 7 K$\Omega$. A constant voltage of 3V was used for the bias applied at the time of observation. The change in the electric current $\Delta i$ due to the change in the piezo resistance of the probe was 170 pA/nm. From above, the change in the piezo resistance was determined to be equal to 2.8 mΩ/nm. From these values, it was determined that the piezo resistance of the probe changed at a rate of about $4 \times 10^{-7}$/nm. The resolution of the AFM observation system obtained under these conditions was 2 nm in the Z-direction. While the lateral resolution depends entirely on the scanning performance of the stage, it was 1 nm in the experiment. The obtained AFM image did not reveal any influence of the drift of the DC component and hence reliably reflected the surface profile of the specimen.

EXAMPLE 2

FIG. 4 is a schematic illustration of the multi-probe AFM used for observing the surface of a specimen. It will be seen the multi-probe unit 402 comprises a total of eight probes. Each of the probes of the multi-probe unit 402 has a configuration same as the one illustrated in FIGS. 3A and 3B. A micro-signal detector 403 similar to the one illustrated in FIGS. 1 and 2 was used for each of the probes. Reference numerals 401 and 404 denote a power source and a computer, respectively. Then, an experiment of AFM observation was carried out by using the above-described detection system. A standard sample with lines & spaces of 500 nm having a depth of 18 nm was used as specimen. Each of the probes was made to scan an area of 100 $\mu$m×100 $\mu$m so that a total area of 100 ×800 $\mu m^2$ was scanned by driving the eight probes simultaneously. A 1 $\mu$F capacitor and a 100 MΩ resistor were used for the CR elements of each of the offset detection systems. Thus, the cut-off frequency obtained by means of the elements was 2 mHz.

The piezo resistance of the probes used in the experiment was about 7 to 7.4 KΩ. A constant voltage of 3V was used for the bias applied at the time of observation. The change in the electric current Δi due to the change in the piezo resistance of each of the probes was found to be between 160 and 190 pA/nm. From above, the change in the piezo resistance of each of the probes was determined to be between 2.6 and 3.2 mΩ/nm. From these values, it was determined that the piezo resistance of each of the probes changed at a rate of about 3.7 to $4.3 \times 10^{-7}$/nm. The resolution of the AFM observation system obtained under these conditions was 2 nm in the Z-direction. While the lateral resolution depends entirely on the scanning performance of the stage, it was 1 nm in the experiment. The obtained AFM image did not reveal any influence of the drift of the DC component and hence reliably reflected the surface profile of the specimen. Additionally, the variances in the piezo resistance among the probes did not affect the obtained image. In other words, the variances were nullified.

EXAMPLE 3

Figure 6:
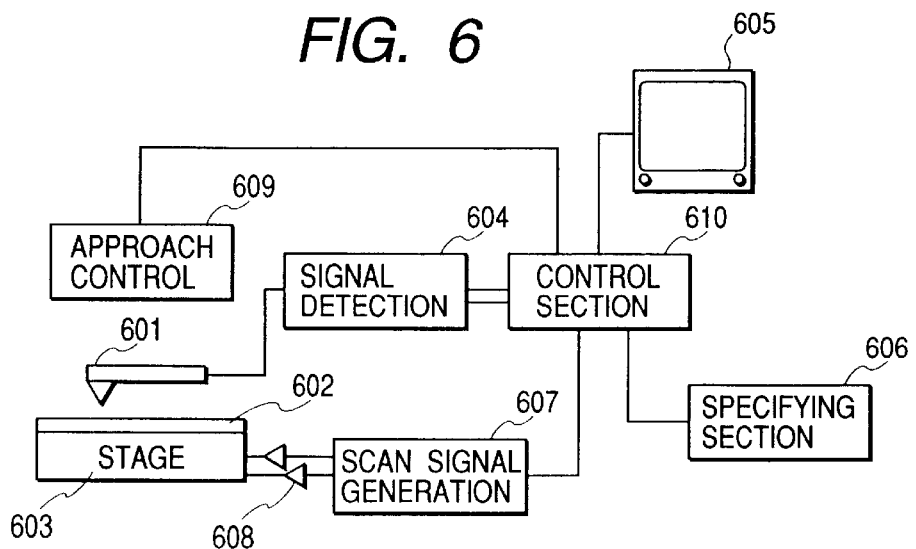
FIG. 6 is a schematic block diagram of the piezo resistance AFM used in Example 3 of the invention.
Figure 7A:
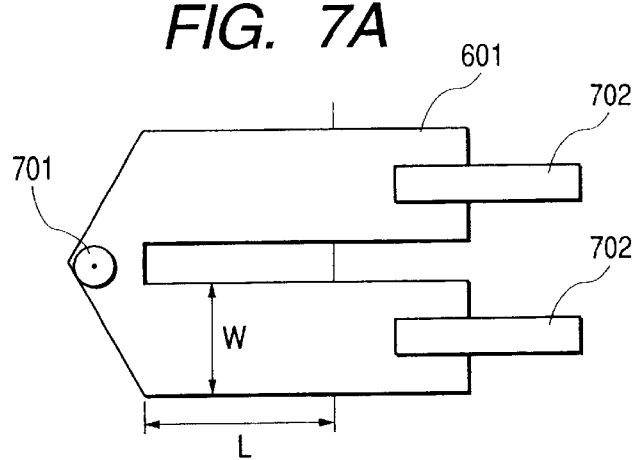
FIGS. 7A and 7B are schematic illustrations of the piezo resistance lever used in Example 3 of the invention.
Figure 7B:
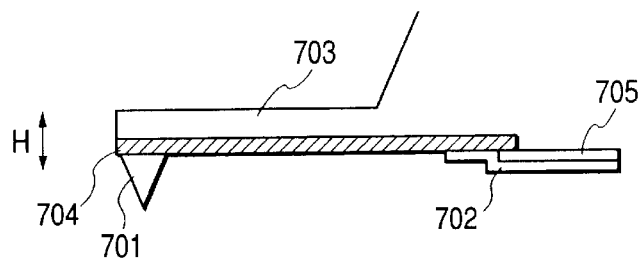

FIG. 6 is a schematic block diagram of the piezo resistance AFM used in Example 3 of the invention. Referring to FIG. 6, reference numeral 601 denotes the cantilever type displacement detection probe comprising a piezo resistance element as deflection detector. FIGS. 7A and 7B are schematic illustrations of the piezo resistance lever type probe used in Example 3 of the invention. Referring to FIGS. 7A and 7B, reference numeral 701 denotes the conical tip arranged at the front end of the lever and electrically held in contact with the piezo resistance member 704 also arranged at the front end of the lever. Reference numeral 703 denotes the silicon substrate and reference numeral 702 denotes the wiring pattern of the probe, while reference numeral 705 denotes the silicon oxide film arranged for electrically isolating the substrate from the wires. As for the size of the probe, the cantilever prepared in this example had a width W of 20 $\mu$m, a length L of 100 $\mu$m and a height H of 2 $\mu$m. The resonance frequency of the lever was about 15 kHz.

Now, the operation of the piezo resistance AFM will be described by referring to FIG. 6. Firstly, the lever type probe 601 and the specimen to be observed 602 are brought close to each other to such an extent that they come to exert force, which is typically atomic force, to each other under the control of approach control section 609. When the probe 601 and the specimen 602 are made to approach each other until they exert force to each other to a predetermined level, scan signal generating section 607 generates a scan signal, which is then applied to the XY drive mechanism of the stage 603 by way of amplifier 608 to drive the stage in an intra-planar direction of the specimen. Then, the probe 601 intra-planarly scans the specimen and detects the information on the change in the force or on the undulations of the surface of the specimen as deflections of the lever and outputs the obtained information as change in the piezo resistance. More specifically, the change in the piezo resistance is observed by the signal detecting section 604 while a constant bias is applied to the piezo resistance element and the obtained information is transmitted to the control section 610. The control section 610 is designed to control mainly the approach control section 609 and the scan signal generating section 607 according to the specified values input by the operator by way of specifying section 606. Additionally, it generates image signals for visualizing the signals from the signal detecting section 604 and send them to monitor 605.

Figure 11:
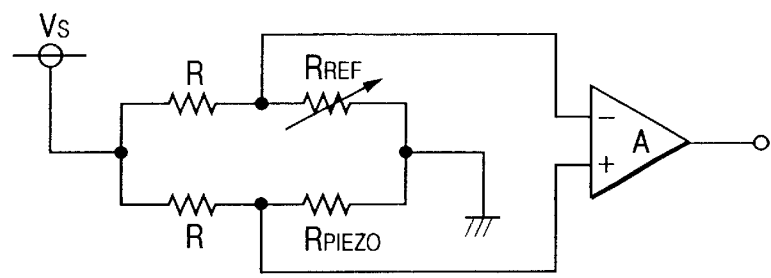
FIG. 11 is a schematic circuit diagram of a known circuit for detecting a change in the electric resistance by means of a bridge.

Now, the signal detecting section 604 that characterizes the p resent invention will be discussed in detail. The signal detecting section 604 is adapted to detect the amount of deflection of the piezo resistance element from the change in the piezo resistance thereof. Conventionally, the change in the resistance is detected by means of a resistor bridge as shown in FIG. 11. Referring to FIG. 11, resistance R is connected to piezo resistance $R_{PIEZO}$ in series while another set of resistance R and reference resistance $R_{REF}$ is arranged to establish a reference bias so that the bias applied to the piezo resistance is detected as the difference, which may be amplified by means of an amplifier. With this arrangement, however, the $R_{REF}$ has to be selected according to the piezo resistance of the lever and the $R_{REF}$ has to be regulated additionally when the piezo resistance is changed by a temperature change to distort the relationship between the two piezo resistances. Still additionally, the gain of a differential amplifier at a downstream has to be selected by taking such a possible change into consideration so that it is not allowed to select a large gain.

Figure 5:
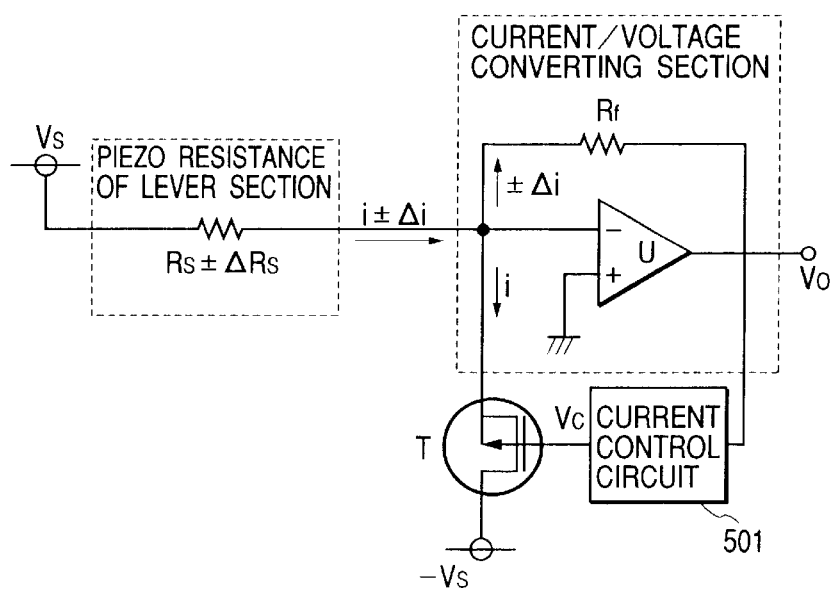
FIG. 5 is a schematic circuit diagram of the piezo resistance detection circuit used in Example 3 of the invention.
Figure 8:
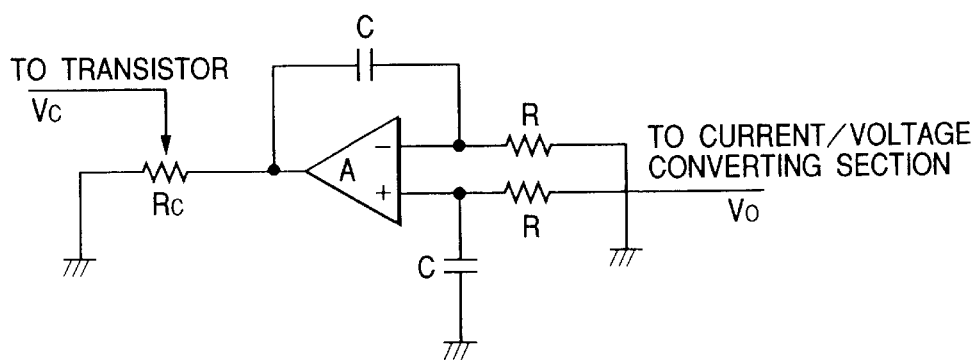
FIG. 8 is a schematic circuit diagram of the current control circuit used in Example 3 of the invention.
Figure 9A:
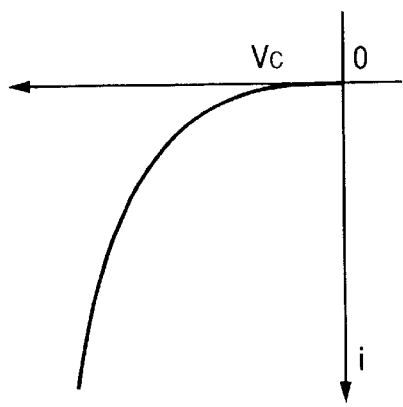
FIGS. 9A and 9B are schematic illustrations of some of the characteristics of the P-channel MOS transistor used in Example 3 of the invention.

To the contrary, with a circuit according to the invention, the deflection signal is detected by detecting only the component attributable to the deflection of the lever out of the electric current that is output when a constant voltage is applied to the piezo resistance. The piezo resistance of the lever section of FIG. 5 includes the piezo resistance Rs observed when the lever is not deflected and the change in the resistance ΔRs produced by the deflection of the lever. Thus, the electric current running therethrough can also be separated into the electric current i for which Rs is responsible and the electric current Δi for which ΔR is responsible. The sum of the two electric currents is input to the current/voltage converting section and only the i component is subtracted therefrom by means of the electric current defined by the power source −Vs and the MOS transistor (P-channel) in FIG. 5. The gate voltage Vc of the MOS transistor is determined by the current control circuit 501 that refers to the output Vo of the current/voltage converting section. In short, a feedback circuit is provided. As the current control circuit 501 is adapted to detect the low frequency component of Vo, a low pass filter or an amplifier may be used for it, although an integrator was used in this example as shown in FIG. 8. FIG. 9A shows the relationship between the gate voltage and the drain current of a P-channel MOS transistor. In view of this characteristic aspect, a non-inverting type integrator was selected for the integrator of FIG. 8 and a variable resistor Rc was arranged to regulate the loop gain. The resistor reference of the current/voltage converting section of FIG. 5 was 10 MΩ. As a result, the conversion gain was $10^6$.

Figure 9B:
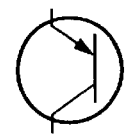

An experiment of AFM observation was carried out by using the above described AFM observation system to find out that an extremely high sensitivity that can not be expected to any conventional piezo resistance AFMs was realized. In other words, a resolution of 0.1 nm was achieved in a direction perpendicular to the surface of the specimen. The prepared lever showed a piezo resistance of 10 kΩ and the ratio of the change in the resistance to the observed deflection was $\Delta Rs/Rs = 10^{-6}$ (per 0.1 nm displacement). Thus, the value of i in FIG. 5 was about 0.1 mA and that of Δi was about 0.1 nA. When the MOS transistor of the circuit of this example was replaced by a bipolar transistor as shown in FIG. 9B, the system operated exactly in the same way to provide the same level of resolution. While atomic force was used for the interaction of the probe and the specimen that were brought close to each other in this example, what is essential for the present invention is that the probe is deflected by the physical force exerted by the interaction of the probe and the specimen so that the present invention is by no means limited to the use of atomic force. For example, static electric force or magnetic force may be used for the interaction.

EXAMPLE 4

Figure 10A:
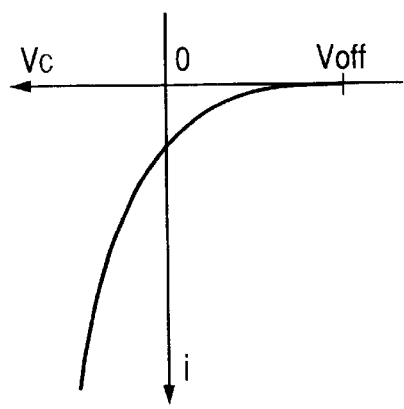
FIGS. 10A and 10B are schematic illustrations of some of the characteristics of the JFET used in Example 4 of the invention.
Figure 10B:
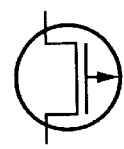
Figure 12:
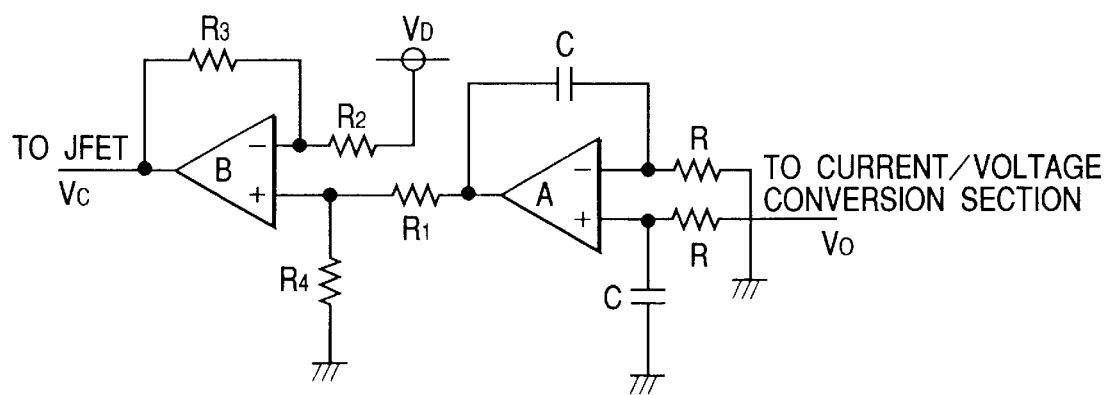
FIG. 12 is a schematic circuit diagram of the current control circuit used in Example 4 of the invention.

In this example, the MOS transistor of Example 3 was replaced by a junction type field effect transistor (JFET) as shown in FIG. 10B. More specifically, a P-channel JFET was used in this example. FIG. 10A shows the relationship between the gate voltage and the drain current of the JFET. The transistor does not become OFF when the bias applied to it is reduced to nil. Therefore, the current control circuit 501 of FIG. 5 had also to be replaced by the one illustrated in FIG. 12, where a circuit for adding a constant voltage was added to an integrator so that the offset voltage $V_{off}$ in FIG. 10A could be cancelled by regulating $V_D$ and R1 through R4. An experiment of AFM observation was carried out by using the above described AFM observation system using a piezo resistance type cantilever as in the case of Example 3 to find that a resolution of 0.1 nm was achieved in a direction perpendicular to the surface of the specimen. All the remaining constants including the resistance values of FIG. 5 were same as those of Example 3.

What is claimed is:

1. A signal detector to be used with a scanning probe having a piezoresistance cantilever with a piezoresistance through which an electric current flows, comprising:
   a current signal detection circuit for detecting a current signal with a frequency representing a change in the electric current; and
   an offset signal detection circuit for removing an offset component from the electric current based on an output of said current detection circuit.

2. A signal detector according to claim 1, wherein said current signal detection circuit includes a circuit for converting the electric current signal into a voltage signal.

3. A signal detector according to claim 1, wherein said offset signal detection circuit includes (i) a current control circuit having a cutoff frequency for separating from the output of said current signal detection circuit a frequency component below the cutoff frequency to generate a current control signal based on the separated frequency component, and (ii) a circuit for generating an offset current based on the current control signal and removing the offset component by using the offset current.

4. A signal detector according to claim 3, wherein said current control circuit comprises an integrator.

5. A signal detector according to claim 3, wherein said current control circuit comprises an adder and an amplifier.

6. A signal detector according to claim 3, wherein said current control circuit comprises a low pass filter.

7. A signal detector according to claim 3, wherein said circuit for generating an offset current and removing the offset component by using the offset current comprises a resistance element.

8. A signal detector according to claim 3, wherein the cutoff frequency is below the frequency of the current signal representing a change in the electric current.

9. A signal detector according to claim 3, wherein the cutoff frequency is 2 mHz.

10. A signal detector according to claim 3, wherein said circuit for generating an offset current and removing the offset component by using the offset current comprises a transistor.

11. An atomic force microscope comprising a signal detector according to claim 1.

12. An atomic force microscope according to claim 10, wherein said microscope comprises a plurality of canning probes.

13. A signal detector according to claim 1, wherein said current signal detection circuit includes an amplification circuit having a feedback resistor.

14. A signal detector according to claim 1, wherein said current signal detection circuit includes an amplification circuit comprising an amplifier having first and second input terminals and an output terminal, and a feedback resistor arranged between the first input terminal and the output terminal, the current signal being input into the first input terminal and output from the output terminal.

15. A signal detector according to claim 1, wherein physical forces exerted on the scanning probe change the electric current flowing through the piezoresistance cantilever.

16. A method of detecting a signal in a scanning probe having a piezoresistance cantilever with a piezoresistance through which an electric current flows, comprising:
   detecting a current signal with a frequency representing a change in the electric current of the piezoresistance cantilever; and
   removing an offset component from the electric current of the piezoresistance cantilever based on an output of said detecting step.

* * * * *

UNITED STATES PATENT AND TRADEMARK OFFICE
CERTIFICATE OF CORRECTION

PATENT NO. : 6,448,553 B1
DATED : September 10, 2002
INVENTOR(S) : Takeaki Itsuji et al.

It is certified that error appears in the above-identified patent and that said Letters Patent is hereby corrected as shown below:

Column 6,
Line 30, "p resent" should read -- present --.

Column 8,
Line 35, "10," should read -- 11, --.

Signed and Sealed this

Seventeenth Day of June, 2003

JAMES E. ROGAN
*Director of the United States Patent and Trademark Office*